United States Patent
Masuda (10) Patent No.: US 10,576,947 B2
(45) Date of Patent: Mar. 3, 2020

(54) ELECTRIC BRAKE SYSTEM

(71) Applicant: NTN CORPORATION, Osaka (JP)

(72) Inventor: Yui Masuda, Iwata (JP)

(73) Assignee: NTN CORPORATION, Osaka (JP)

(*) Notice: Subject to any disclaimer, the term of this patent is extended or adjusted under 35 U.S.C. 154(b) by 85 days.

(21) Appl. No.: 15/883,752

(22) Filed: Jan. 30, 2018

(65) Prior Publication Data

US 2018/0162334 A1 Jun. 14, 2018

Related U.S. Application Data

(63) Continuation of application No. PCT/JP2016/072677, filed on Aug. 2, 2016.

(30) Foreign Application Priority Data

Aug. 10, 2015 (JP) .................................. 2015-158027

(51) Int. Cl.
*B60T 8/72* (2006.01)
*B60T 7/12* (2006.01)
(Continued)

(52) U.S. Cl.
CPC ................ *B60T 8/17* (2013.01); *B60K 31/02* (2013.01); *B60T 1/065* (2013.01); *B60T 7/12* (2013.01);
(Continued)

(58) Field of Classification Search
CPC ... B60T 1/00; B60T 1/065; B60T 8/00; B60T 8/17; B60T 8/32; B60T 8/72;
(Continued)

(56) References Cited

U.S. PATENT DOCUMENTS 6,496,768 B2 * 12/2002 Yamamoto ............ B60T 8/3255
303/115.2
7,344,207 B2 3/2008 Sibre
(Continued)

FOREIGN PATENT DOCUMENTS

CN 101559765 10/2009
EP 3 042 814 A1 7/2016
(Continued)

OTHER PUBLICATIONS

International Search Report dated Nov. 1, 2016 in corresponding International Patent Application No. PCT/JP2016/072677.
(Continued)

*Primary Examiner* — Yonel Beaulieu (57) ABSTRACT

Provided is an electric brake system that changes responsiveness depending on responsiveness required for an electric brake device, thereby enabling operation sound and power consumption to be reduced without influencing movement of a vehicle. The electric brake system includes one or more electric brake device (3) each having a control operation module (12) for performing follow-up control for a target braking force. The electric brake system includes a response requirement determination module (14) for determining responsiveness required for the brake actuator (4) from one or both of a braking requirement and the vehicle travelling condition. The braking requirement is outputted from a brake operation member or a vehicle-stable-travelling control system. The electric brake system includes a control modification module (15) for changing a control operation formula to be used for follow-up control by the module (12), depending on responsiveness determined by the module (14).

6 Claims, 9 Drawing Sheets

(51) Int. Cl.
*F16D 65/14* (2006.01)
*B60T 13/74* (2006.01)
*B60T 8/17* (2006.01)
*F16D 65/18* (2006.01)
*B60T 8/1755* (2006.01)
*B60T 8/1761* (2006.01)
*B60T 13/66* (2006.01)
*B60T 7/22* (2006.01)
*F16D 55/226* (2006.01)
*B60K 31/02* (2006.01)
*B60T 1/06* (2006.01)
*B60K 31/00* (2006.01)

(52) U.S. Cl.
CPC .............. *B60T 7/22* (2013.01); *B60T 8/1755* (2013.01); *B60T 8/1761* (2013.01); *B60T 8/17555* (2013.01); *B60T 8/72* (2013.01); *B60T 13/662* (2013.01); *B60T 13/74* (2013.01); *B60T 13/741* (2013.01); *F16D 55/226* (2013.01); *F16D 65/18* (2013.01); *F16D 65/183* (2013.01); *B60K 2031/0091* (2013.01); *B60W 2520/10* (2013.01); *B60W 2710/182* (2013.01); *B60W 2720/10* (2013.01); *B60Y 2300/143* (2013.01); *B60Y 2400/81* (2013.01)

(58) Field of Classification Search
CPC ...... B60T 8/1761; B60T 8/17555; B60T 7/00; B60T 7/12; B60T 7/22; B60T 13/00; B60T 13/74; B60T 13/741; F16D 65/00; F16D 65/14; F16D 65/18; F16D 65/183; B60K 31/00; B60K 31/02; B50W 50/00; B50W 50/10
See application file for complete search history.

(56) References Cited

U.S. PATENT DOCUMENTS

| | | | |
|---|---|---|---|
| 7,810,616 B2 | 10/2010 | Nakazeki | |
| 8,336,969 B2 | 12/2012 | Sano et al. | |
| 8,833,869 B2 | 9/2014 | Matsuzaki et al. | |
| 8,899,695 B2 * | 12/2014 | Tanaka | B60T 13/745 303/14 |
| 9,518,625 B2 * | 12/2016 | Putz | B60T 13/065 |
| 9,915,308 B2 | 3/2018 | Masuda | |
| 10,246,064 B2 * | 4/2019 | Masuda | B60T 13/74 |
| 2002/0026272 A1 * | 2/2002 | Yamamoto | B60T 8/3255 701/70 |
| 2008/0110704 A1 * | 5/2008 | Nakazeki | F16D 65/18 188/158 |
| 2008/0236964 A1 * | 10/2008 | Kikuchi | B60T 13/741 188/162 |
| 2009/0183958 A1 | 7/2009 | Sano et al. | |
| 2010/0253137 A1 | 10/2010 | Matsuzaki et al. | |
| 2012/0112524 A1 * | 5/2012 | Shibata | B60T 13/146 303/10 |
| 2015/0151727 A1 * | 6/2015 | Yasui | B60T 13/741 701/70 |
| 2016/0208871 A1 | 7/2016 | Masuda | |

FOREIGN PATENT DOCUMENTS

| | | |
|---|---|---|
| JP | 6-327190 | 11/1994 |
| JP | 2002-67906 | 3/2002 |
| JP | 2006-194356 | 7/2006 |
| JP | 2007-50742 | 3/2007 |
| JP | 2010-42702 | 2/2010 |
| JP | 2010-241171 | 10/2010 |
| WO | WO 2015/033863 | 3/2015 |

OTHER PUBLICATIONS

English Translation of the International Preliminary Report on Patentability dated Feb. 22, 2018 in corresponding International Patent Application No. PCT/JP2016/072677. 10 pp.
Extended European Search Report dated Feb. 13, 2019 in corresponding European Patent Application No. 16835026.2,7 pages.
Chinese Office Action dated Aug. 2, 2019 in corresponding Chinese Patent Application No. 201680046671.9.
Notice of Reasons for Refusal dated Jun. 25, 2019 in related Japanese Patent Application No. 2015-158027 (7 pages).

* cited by examiner

ELECTRIC BRAKE SYSTEM

CROSS REFERENCE TO THE RELATED APPLICATION

This application is a continuation application, under 35 U.S.C. § 111(a), of international application No. PCT/JP2016/072677, filed Aug. 2, 2016, which claims Convention priority to Japanese patent application No. 2015-158027, filed Aug. 10, 2015, the entire disclosure of which is herein incorporated by reference as a part of this application.

BACKGROUND OF THE INVENTION

Field of the Invention

The present invention relates to an electric brake system provided to a vehicle such as an automobile.

Description of Related Art

Conventionally, an electric brake device that controls a braking force by an electric motor is proposed (for example, Patent Document 1). In addition, an electric actuator using a planetary roller screw mechanism is proposed (for example, Patent Document 2).

RELATED DOCUMENT

Patent Document

[Patent Document 1] JP Laid-open Patent Publication No. H06-327190
[Patent Document 2] JP Laid-open Patent Publication No. 2006-194356

SUMMARY OF THE INVENTION

Electric brake devices as shown in Patent Documents 1, 2 might be required to reduce operation sound. Such an electric brake device causes a sound of a different type from those of hydraulic brake devices which are generally prevalent, and is likely to make a driver or the like uncomfortable even if the sound is small.

In the electric brake device, in order to reduce the operation sound, it is necessary to lower the operation speed, i.e., responsiveness, of the electric brake device. In other words, there is a trade-off between the operation sound and the responsiveness. If the operation sound is reduced, the responsiveness is lowered and this might lead to increase in braking distance or deterioration in brake feeling. Nevertheless, it is desirable to reduce the operation sound of the electric brake device as much as possible, in order to address noise, vibration, harshness (NVH) as required in recent years.

An object of the present invention is to provide an electric brake system that changes responsiveness depending on responsiveness required for an electric brake device, thereby enabling operation sound and power consumption to be reduced without influencing movement of a vehicle.

Hereinafter, the present invention will be described, while referring to the reference characters in the embodiments for convenience sake in order to facilitate the understanding.

An electric brake system according to the present invention is an electric brake system including one or more electric brake device 3, each electric brake device 3 includes: a brake actuator 4 mounted on a vehicle 1, the brake actuator having a brake rotor 31, a friction member 32, a friction member actuator 33 configured to press the friction member 32 to the brake rotor 31, and an electric motor 34 configured to drive the friction member actuator 33; and a control operation module 12 configured to perform follow-up control so that a braking force generated by the brake actuator 4 follows a target braking force by controlling the electric motor 34, the electric brake system including: a response requirement determination module 14 configured to determine responsiveness required for the brake actuator 4, by applying a predetermined rule, from one or both of a braking requirement and information about a travelling condition of the vehicle 1, the braking requirement being outputted from a brake operation member 8 which is manipulated by a vehicle operator or from a vehicle-stable-travelling control system for generating the braking force in order to cause the vehicle 1 to travel stably; and a control modification module 15 configured to change a control operation formula to be used for the follow-up control by the control operation module 12, depending on the responsiveness determined by the response requirement determination module 14.

It is noted that the above wording "change a control operation formula" includes a case where a parameter used in the control operation formula is changed.

According to the above configuration, the response requirement determination module 14 determines the responsiveness required for the brake actuator 4, from one or both of the braking requirement and the information about the travelling condition of the vehicle. The control modification module 15 changes the control operation formula to be used for the follow-up control by the control operation module 12, depending on the responsiveness determined by the response requirement determination module 14. Therefore, it is possible to control changing the responsiveness depending on responsiveness required for the electric brake device 3. Thus, operation sound and power consumption are reduced without influencing movement of the vehicle. It is noted that the "brake operation member" is, for example, a brake pedal. In addition, the "vehicle-stable-travelling control system" is, for example, an antilock control system (ABS), an attitude control device, or collision preventing control device. In addition, the "information about a travelling condition of the vehicle" includes the travelling speed, the change rate of the travelling speed (acceleration or deceleration), the turning angle, the steering angle, or the like. The responsiveness determined by the response requirement determination module 14 may be a stepwise value or a continuous value.

In the present invention, the response requirement determination module 14 may determine responsiveness of the braking force from the target braking force or a control target value obtained from the target braking force. For example, in the case where the degree of change in the target braking force or in a control target value obtained from the target braking force is great, the electric brake device 3 is required to have high responsiveness so as to be able to follow the control target value, in order to improve safety, vehicle behavior, and the like. On the other hand, in the case where the degree of change is small, the electric brake device 3 is required to perform silent operation so as not to give an uncomfortable feeling to a vehicle operator, rather than having responsiveness. Therefore, if the response requirement determination module 14 is configured to determine the responsiveness of the braking force from the target braking force or the control target value obtained from the target braking force, operation sound and power consumption are reduced without influencing movement of the vehicle. It is noted that the control target value obtained from the target braking force is, for example, a voltage value, a current value, a motor rotational position, or the advancement/retraction position of the friction member actuator 33.

In the present invention, the response requirement determination module 14 may estimate responses of the brake actuator 4, each response being obtained when a corresponding one of a plurality of control operation formulas is applied, the control modification module 15 allowing switchover among the plurality of control operation formulas, compare the plurality of estimation results with each other, and determine the responsiveness of the braking force on the basis of the estimation comparison results. Performing a plurality of estimations for responsiveness and comparing the estimation results with each other as described above makes it possible to more appropriately determine brake responsiveness fulfilling desired silence.

In the present invention, the response requirement determination module 14 may determine responsiveness of the braking force from at least one of a speed of the vehicle on which the electric brake device 3 is mounted, and a wheel speed thereof. In the case where the speed of the vehicle is fast or the wheel speed is fast, great sound due to travelling occurs at a part other than the brake device 3. On the other hand, in such a case, responsiveness of the braking force is desired to be as fast as possible. Since the response requirement determination module 14 is configured to determine the responsiveness from at least one of the speed of the vehicle and the wheel speed, operation sound and power consumption are reduced more effectively without influencing movement of the vehicle.

In the present invention, a wheel speed control device 17 may be provided which is configured to control a wheel speed with use of the braking force without depending on the vehicle operator's manipulation to the brake operation member of the vehicle to which the electric brake system is provided, and in a state in which the control by the wheel speed control device 17 is being executed, the response requirement determination module 14 may select a predetermined control operation formula that achieves fast responsiveness as the control operation formula. The wheel speed control device 17 is, for example, antilock control. In a state in which the wheel speed control device is executing control of the wheel speed with use of the braking force without depending on a vehicle operator's manipulation, it is general that fast responsiveness is required as in antilock control or the like. Therefore, in such a case, it is desirable to use a control operation formula that achieves fast responsiveness.

In the present invention, when the speed of the vehicle to which the electric brake system is provided is equal to or smaller than a predetermined value, the response requirement determination module 14 may select a predetermined control operation formula that achieves slow responsiveness as the control operation formula. In the case where the speed of the vehicle is slow, actual harm is less likely to occur even if the brake operation lags to some extent, and meanwhile, since the travelling condition is silent, silence is desired. Therefore, it is desirable that the response requirement determination module 14 selects a control operation formula that achieves slow responsiveness as the control operation formula. It is noted that the predetermined value may be a value that can be regarded as a stopped state, for example.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
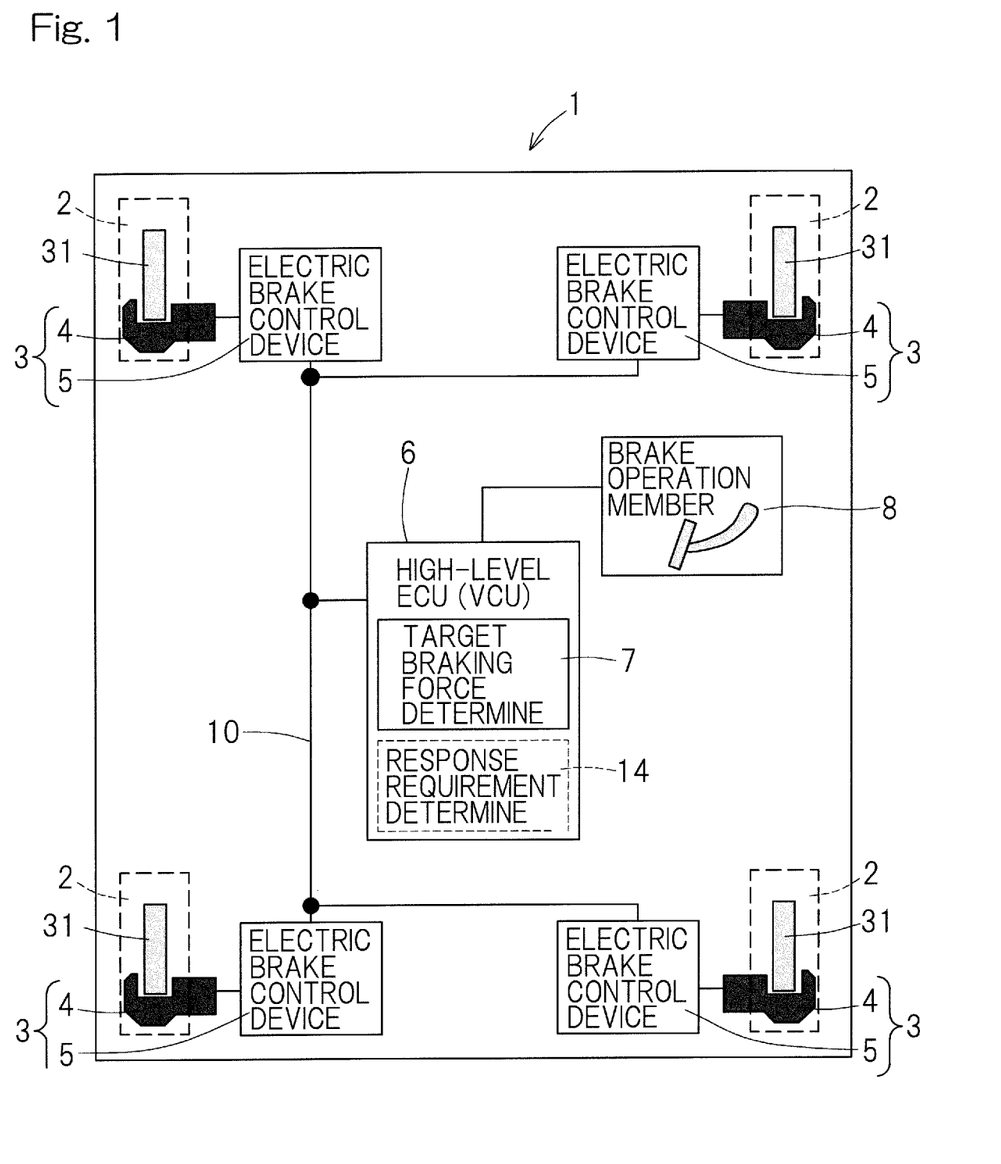
FIG. 1 illustrates a conceptual configuration regarding braking parts in a vehicle provided with an electric brake system according to an embodiment of the present invention.

An embodiment of the present invention will be described with reference to the drawings. FIG. 1 shows an example in which an electric brake system of the present embodiment is used in a vehicle such as an automobile having four wheels. In the vehicle 1, an electric brake device 3 is provided to each of left and right wheels 2 on the front side (upper side in FIG. 1) and the rear side. A travelling driving source (not shown) is an internal combustion engine or an electric motor, or both of them. The electric brake device 3 may be a friction brake device. The electric brake device 3 is composed of a brake actuator 4, which is a mechanistic part, and an electric brake control device 5 for controlling the brake actuator 4. It is noted that the configuration shown in the present embodiment is a configuration needed for implementing the electric brake system proposed by the present inventors, and other functions such as a redundant function may be added appropriately as necessary.

Figure 2:
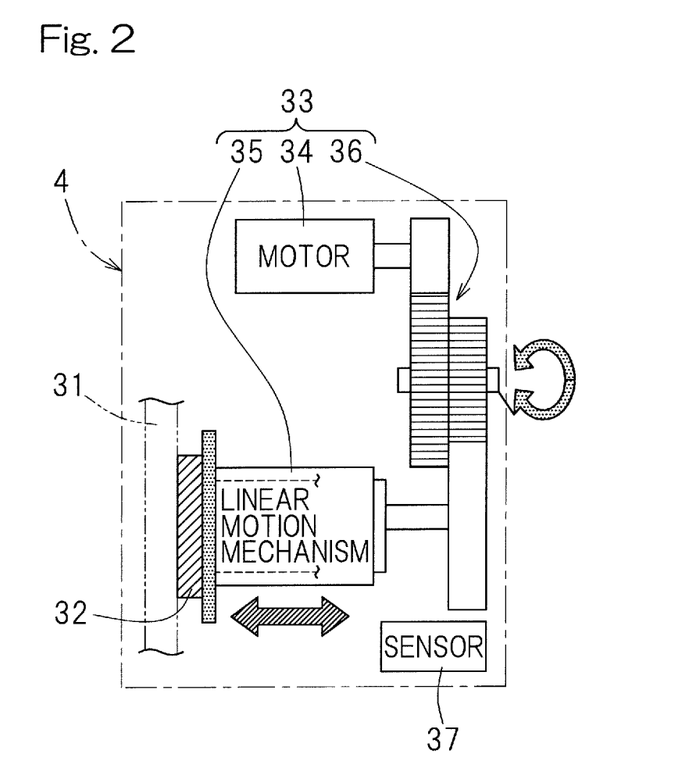
FIG. 2 is a schematic diagram of an example of a brake actuator in the electric brake system.

The brake actuator 4 has, for example, as shown in FIG. 2, a brake rotor 31, a friction member 32, and a friction member actuator 33 for pressing the friction member 32 to the brake rotor 31, and a sensor 37 for detecting, for example, a state quantity of the brake actuator 4. The brake rotor 31 is fixed integrally with the wheel to rotate therewith. The friction member actuator 33 is composed of: an electric motor 34, which is a driving source; a linear motion mechanism 35, which converts rotation transmitted from the electric motor 34, into a forward/backward linear motion of the friction member 32; and a speed reducer 36, such as a gear train for transmitting rotation of the electric motor 34 to the linear motion mechanism 35.

As the electric motor 34, using a BLDC motor achieves space saving and high output, but a brushed DC motor, an induction motor, or the like may be used. As the linear motion mechanism 35, for example, various screw mechanisms, or a slope sliding mechanism such as a ball ramp mechanism may be used. The speed reducer 36 may be realized by, for example, parallel gears, which reduce cost, but planetary gears or the like may be used, or in such a case where, for example, a required driving force is small, the speed reducer may not be provided. As the sensor 37, a single sensor or a plurality of sensors may be provided. In the drawing, one sensor 37 is shown as an example. The sensor 37 may be, for example, an electric motor angle sensor, a braking force estimation sensor, or the like in the brake actuator 4, and in addition thereto, for example, a vehicle speed sensor which is present outside the brake actuator 4, or a wheel speed sensor of the corresponding wheel 2 to which the brake actuator 4 is provided.

Referring to FIG. 1, in accordance with a target braking force distributed from a target braking force determination module 7, which is provided to a high-level ECU 6, which is a high-level control module, the brake actuator 4 of each electric brake device 3 is controlled by the corresponding electric brake control device 5, which is connected to the high-level ECU 6. The target braking force determination module 7 generates the target braking force to be distributed to the electric brake devices 3, primarily using an operation amount, such as brake pedaling amount, of a brake operation member 8, such as a brake pedal, which receives input of a brake operation from an operator. The high-level ECU 6 is an electric control unit which performs coordination control and overall control for the entire vehicle 1, control for a driving source (not shown) of the vehicle 1 in accordance with an operation amount of an accelerator operation device (not shown), and the like. The high-level ECU may be called a VCU. Instead of being provided to the high-level ECU 6 as described above, the target braking force determination module 7 may be provided, to an ECU (not shown) for the electric brake device, as a part of a brake overall control device for performing overall control for the brake, for example.

Figure 3:
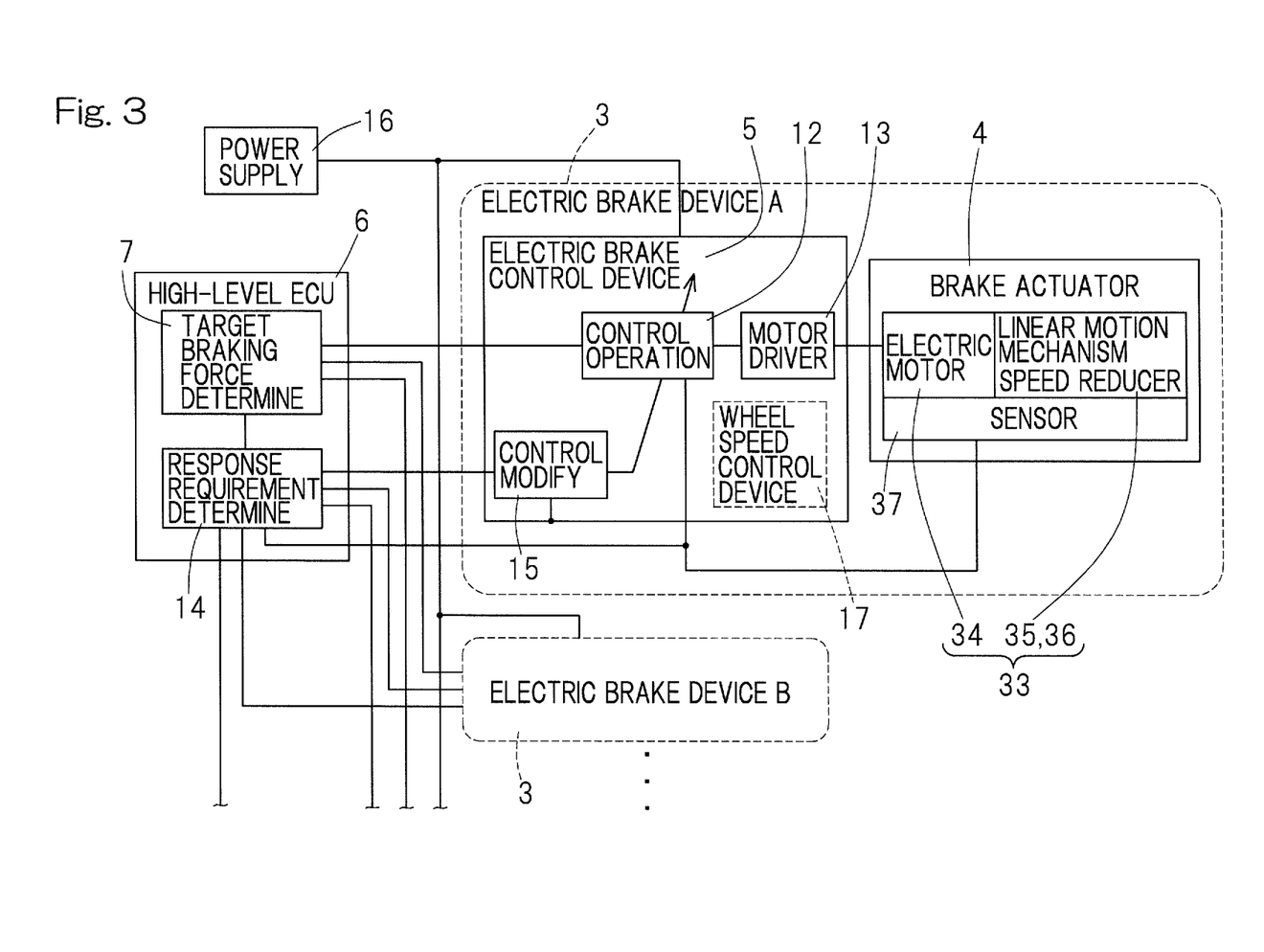
FIG. 3 is a block diagram of a conceptual configuration of the electric brake system.
Figure 4:
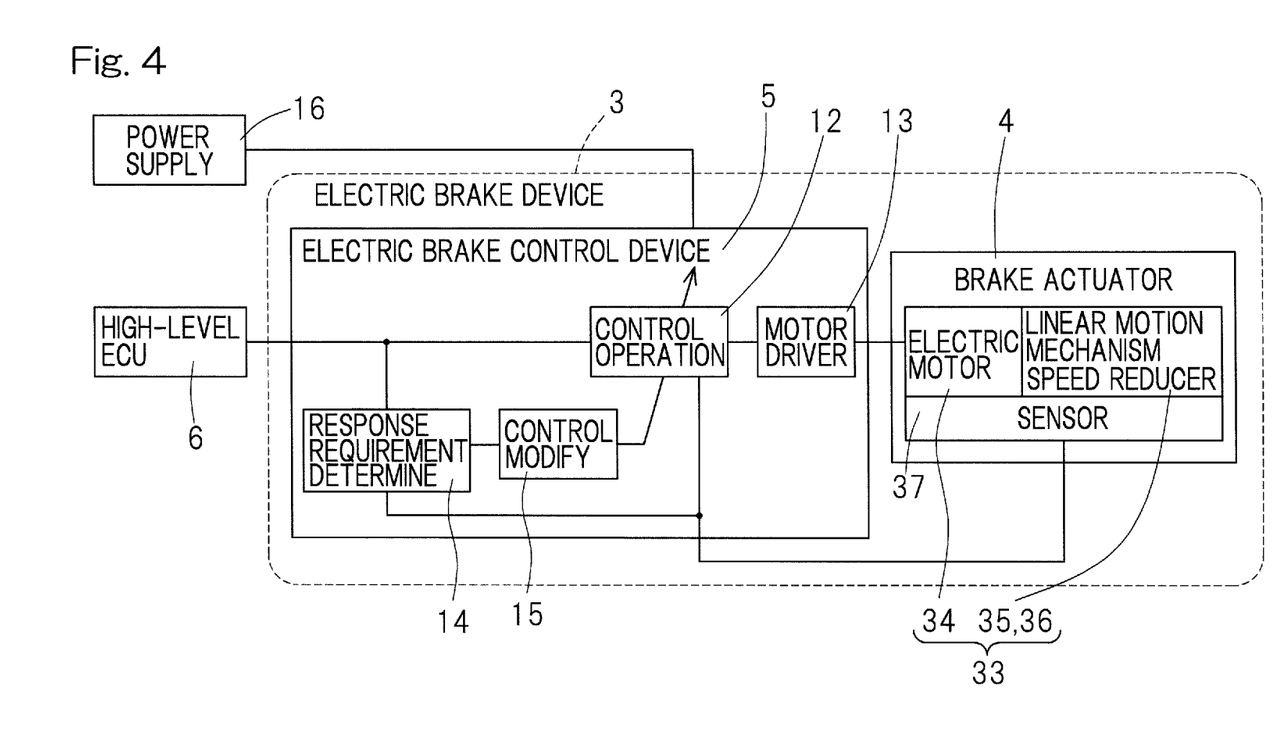
FIG. 4 is a block diagram of a conceptual configuration according to a modification of the electric brake system.

In FIG. 3, the electric brake control device 5 includes, as a basic configuration: a control operation module 12 for controlling a braking force so as to follow a target value; and a motor driver 13. The electric brake device further includes a control modification module 15 for adjusting the function of the control operation module 12. The adjustment may include, when there are a plurality of outputs from the control operation module 12, operation of adjusting or selecting these outputs. A response requirement determination module 14 performs determination of a response requirement, i.e., determines responsiveness that can be required for the braking force. In the example in FIG. 3, the response requirement determination module 14 is provided to the high-level ECU 6. However, for example, as shown in FIG. 4, the response requirement determination module 14 may be provided in the electric brake control device 5. In the example in FIG. 4, the electric brake system may be composed of a single electric brake device 3. The electric brake system of the present embodiment includes an electric brake device including: the brake actuator 4 having the brake rotor 31, the friction member 32, the friction member actuator 33, and the electric motor 34 for driving the friction member actuator 35; and the control operation module 12, and further includes the response requirement determination module 14 and the control modification module 15.

In the case where the response requirement determination module 14 is provided to the high-level ECU 6 as shown in FIG. 3, it is possible to perform responsiveness requirement determination more finely and accurately on the basis of information including information about the plurality of connected electric brake devices 3 and various information about the vehicle to which the electric brake system is provided, but on the other hand, communication of a command signal and the like with each electric brake control device 5 is complicated. In the example in FIG. 3, commands from the high-level ECU 6 to the control operation module 12 and the control modification module 15 are shown by separate connections. However, for example, these commands and the like may be allocated to predetermined slots in time-multiplexed data according to a communication protocol such as CAN, and such a configuration can be implemented by a single connection.

The control operation module 12 and the control modification module 15, or these and the response requirement determination module 14 may be implemented by, for example, a microcomputer, FPGA, ASIC, or DSP. In this case, if these are packaged together so as to be implemented as functions in a single element, a simple hardware configuration is obtained. Alternatively, they may be implemented in separate elements.

The control operation module 12 controls a braking force to be generated by the brake actuator 4 so as to follow the target braking force by controlling the electric motor 34. The motor driver 13 converts control operation amounts such as voltage outputted from the control operation module 12, to application voltage to the electric motor 34, and the like. The motor driver 13 may be implemented by, for example, a half-bridge circuit composed of FET elements driven by PWM.

As a power supply device 16, for example, a low-voltage battery in a four-wheel automobile may be used. Alternatively, the power supply device 16 may be, for example, a high-voltage power supply in an EV or an HEV, and/or a DC-DC converter connected the high-voltage power supply or a capacitor, or may be a power supply system using these in combination.

The response requirement determination module 14 determines responsiveness required for the brake actuator 4, by applying a predetermined rule, from one or both of: a braking requirement outputted from the brake operation member 8 (see FIG. 1) or a control system (not shown) for stable travelling of the vehicle 1; and information about the travelling condition of the vehicle 1. This rule is, for example, as described later in detail with reference to FIGS. 5 to 9, for changing responsiveness and/or determining a reference for changing the responsiveness, using the degree of change in the target braking force, which is a braking requirement, and the vehicle speed (or wheel speed). The control system for stable travelling is for generating a braking force during the control in order to cause the vehicle to travel stably. An example of the control system for stable travelling is an antilock control system (ABS), using a wheel speed control device 17 (FIG. 3), or is a collision preventing control device, an attitude control device, etc. The response requirement determination module 14 may be configured to determine responsiveness of the braking force on the basis of the target braking force or a control target value obtained from the target braking force.

The control modification module 15 changes a control operation formula to be used for the follow-up control by the control operation module 12, depending on the responsiveness determined by the response requirement determination module 14. This change includes changing an output value by selecting among outputs from a plurality of control operation formulas included in the control operation module 12. The change of the control operation formula may include not only change in the formula itself but also change in a parameter of the control operation formula, for example.

Figure 5:
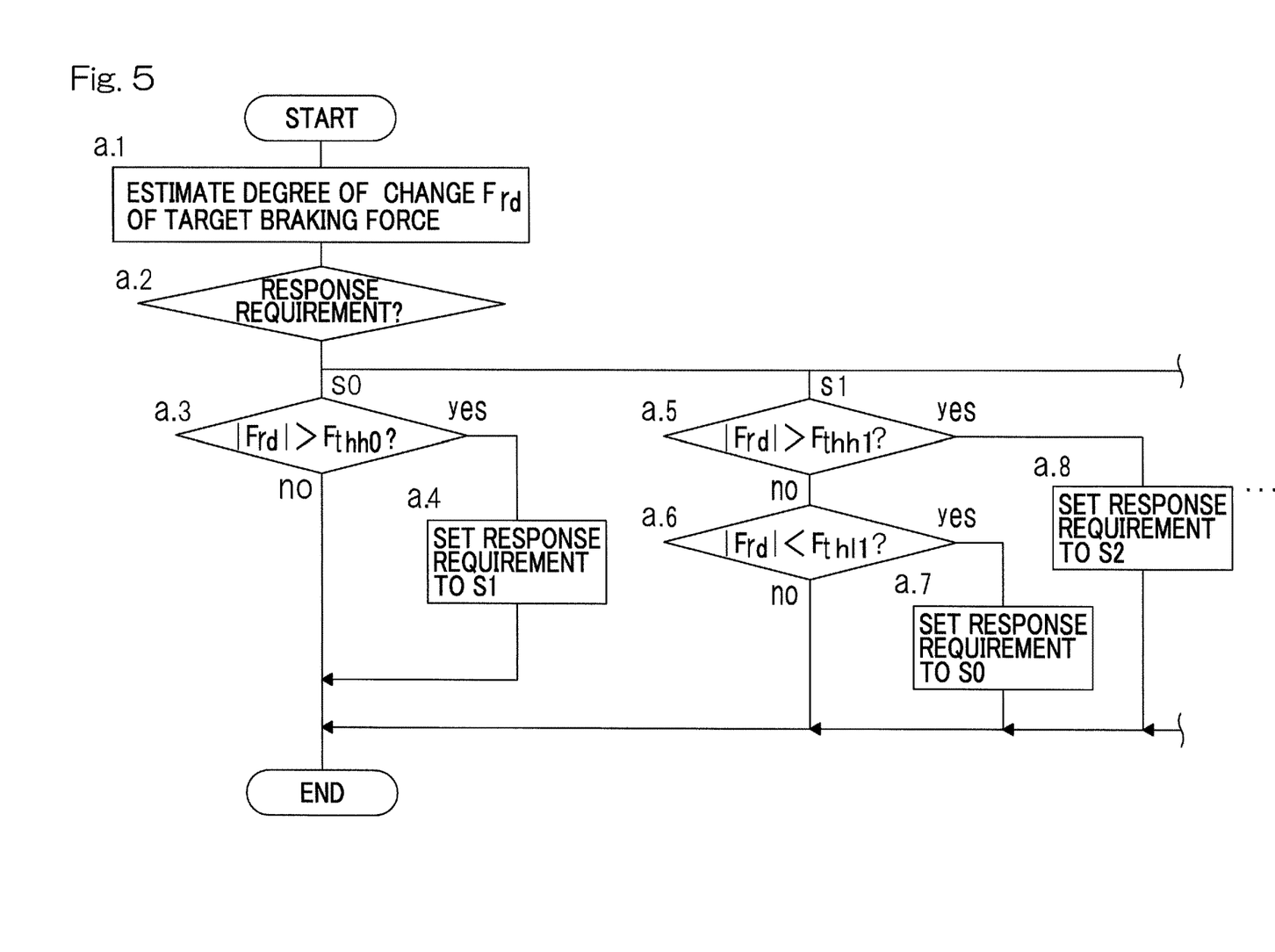
FIG. 5 is a flowchart showing a basic control example by a response requirement determination module in the electric brake system.
Figure 6:
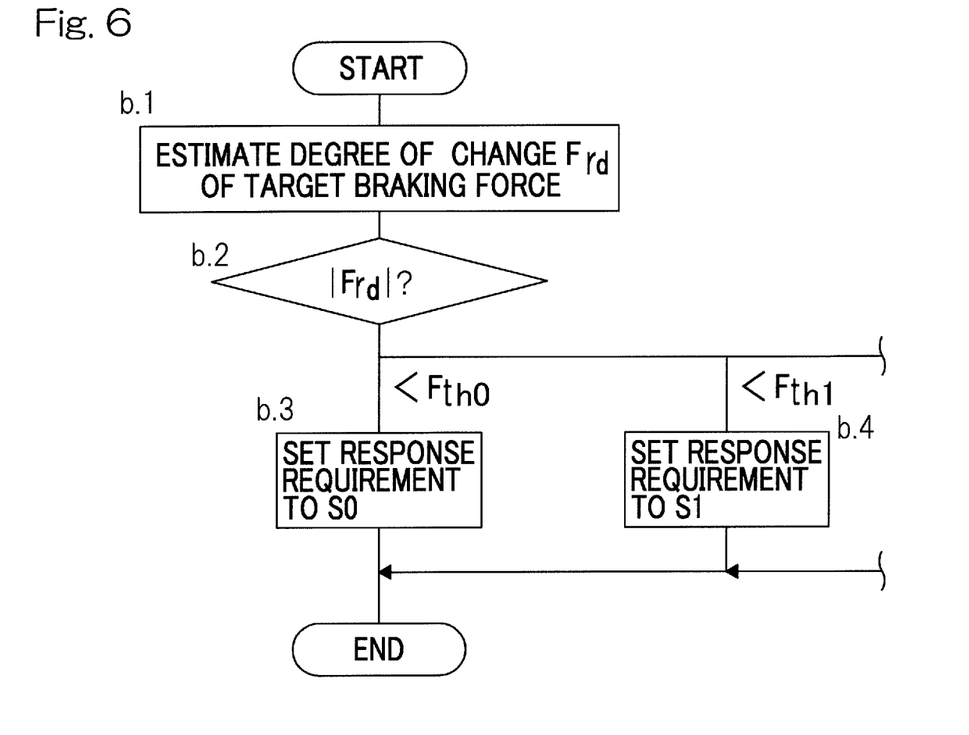
FIG. 6 is a flowchart showing another basic control example by the response requirement determination module in the electric brake system.

FIG. 5 to FIG. 9 show specific examples of a determination method for a response requirement by the response requirement determination module 14. One of the controls in FIG. 5 and FIG. 6 is to be selectively performed. The controls in FIG. 7 to FIG. 9 may be used together with the control in FIG. 5 or FIG. 6, or the controls in any of FIG. 7 to FIG. 9 may be combined.

FIG. 5 shows an example in which the response requirement is determined on the basis of the degree of change in the target braking force, which is a braking requirement. In step a.1, a degree of change $F_{rd}$ is obtained. The degree of change $F_{rd}$ is one of control target values obtained from the target braking force. As the degree of change $F_{rd}$, for example, a differential value of the target braking force or the frequency of the target braking force may be used. In step a.2, the branch depending on the current response requirement is determined, and the process proceeds to the determined branch. S0, S1, . . . indicate a plurality of set response requirement levels, and it is assumed that these requirement levels are faster in order of S0<S1< . . . .

In each of steps a.3, a.5, . . . , which processes a response requirement at the corresponding branch, the absolute value of the degree of change $F_{rd}$ is compared with a corresponding threshold value $F_{thxx}$ (x is any alphanumeric character) (steps a.3, a.5, a.6, . . . ). As a result of the comparison, if the degree of change $F_{rd}$ is greater than a threshold value $F_{thhn}$ (n is 0 or any natural number; the same applies hereafter), the response requirement is set to a level (S1, S2, . . . ) which is in the step corresponding to a speed-up direction (step a.4, a.8, . . . ). On the other hand, if the degree of change $F_{rd}$ is smaller than a threshold value $F_{thln}$ (in the threshold value $F_{thln}$, n is any natural number, not including 0), the response requirement is set to a level (S0, S1, S2, . . . ) which is in the step corresponding to a speed-down direction (step a.7, . . . ). The threshold value $F_{thhn}$ is a threshold value for the response requirement level Sn to shift to a faster response requirement, and the threshold value $F_{thln}$ is a threshold value for the response requirement level Sn to shift to a slower response requirement. Here, if the threshold values are set to satisfy $F_{thhn} > F_{thl(n+1)}$ to provide hysteresis, the response requirement is prevented from switching too frequently. In the drawings, for simplification purpose, an example in which the response requirement is shifted on a one-step basis is shown. However, a process of jumping over a plurality of steps among the plurality of provided response requirements, e.g., from S0 to S3, may be employed.

FIG. 6 shows an example in which the response requirement is determined directly from the degree of change $F_{rd}$ in the target braking force, instead of the example in FIG. 5. In step b.2, the degree of change $F_{rd}$ is compared with $F_{thn}$. The $F_{thln}$ is a threshold value for the response requirement Sn. As shown in FIG. 6, the process proceeds to one of steps b.3, b.4, . . . in accordance with a result of comparison with the threshold value. In this example, the calculation load is small because the process is simple, whereas it is difficult to have flexibility such as adjusting a response requirement shift condition in accordance with the response requirement.

Figure 7:
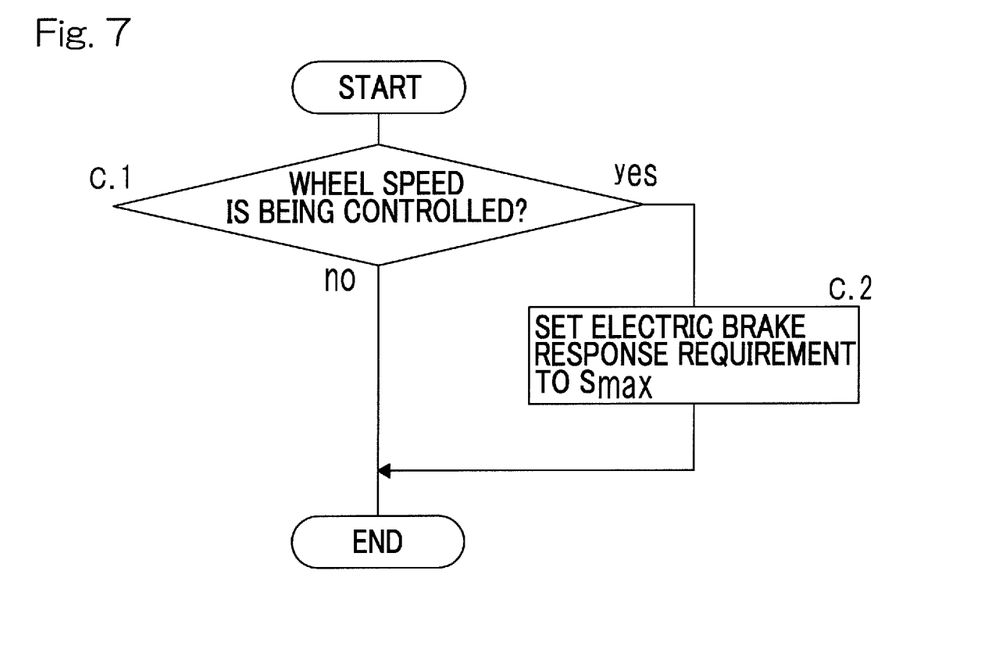
FIG. 7 is a flowchart showing an example of a process added to the basic control example by the response requirement determination module in the electric brake system.

FIG. 7 shows an example in which the response requirement is shifted to a fastest response requirement $S_{max}$ when wheel speed control is performed. The control in FIG. 7 is performed prior to the control in FIG. 5 or FIG. 6. In this example, whether or not the wheel speed control (for example, executed by the wheel speed control device 17) is being performed is determined (step c.1), and then, if the wheel speed control is being performed, the response requirement of the electric brake device 3 is set to the fastest response requirement $S_{max}$ (step c.2). If the wheel speed control is not being performed, the process is ended as it is. Thereafter, the control in FIG. 5 or FIG. 6 is performed, and then the process in FIG. 7 is repeated from the beginning. The wheel speed control is, for example, antilock control.

In general, a situation in which the fastest responsiveness is required in a vehicle is when the wheel speed is controlled. For example, in antilock control, brake responsiveness greatly influences the braking distance, and therefore the process in FIG. 7 is effective for improving safety. It is noted that, in the process in FIG. 5 or FIG. 6, if a fast target braking force is inputted, the response requirement necessarily shifts to a faster side, but the process in FIG. 7 enables the response requirement to be made faster more reliably.

Figure 8:
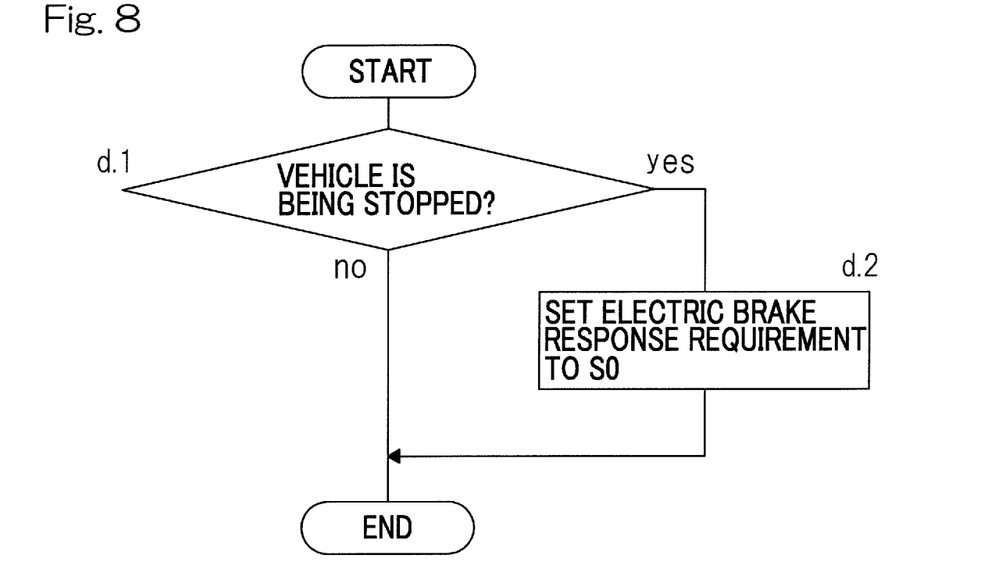
FIG. 8 is a flowchart showing another example of a process added to the basic control example by the response requirement determination module in the electric brake system.

FIG. 8 shows an example in which the response requirement is shifted to a slowest response requirement S0 when the vehicle is being stopped. In the process in FIG. 8, whether or not the vehicle is being stopped is determined (step d.1), and then, if the vehicle is being stopped, the response requirement of the electric brake device 3 is set to S0. If the vehicle is not being stopped, the process in FIG. 8 is ended as it is without changing the response requirement. Thereafter, the control in FIG. 5 or FIG. 6 is performed.

In general, fast brake operation is not needed when the vehicle is being stopped. Meanwhile, since road noise or the like does not occur when the vehicle is being stopped, an operation sound of the electric brake device which is likely to be conspicuous needs to be reduced as much as possible. Therefore, the process in FIG. 8 is effective for improvement in NVH. It is noted that, regarding the determination as to whether or not the vehicle is being stopped (step d.1), if a process in which the vehicle is regarded as stopped when the vehicle speed is approximately zero is employed, accuracy requirement of a wheel speed sensor and an acceleration sensor can be less severe.

Figure 9:
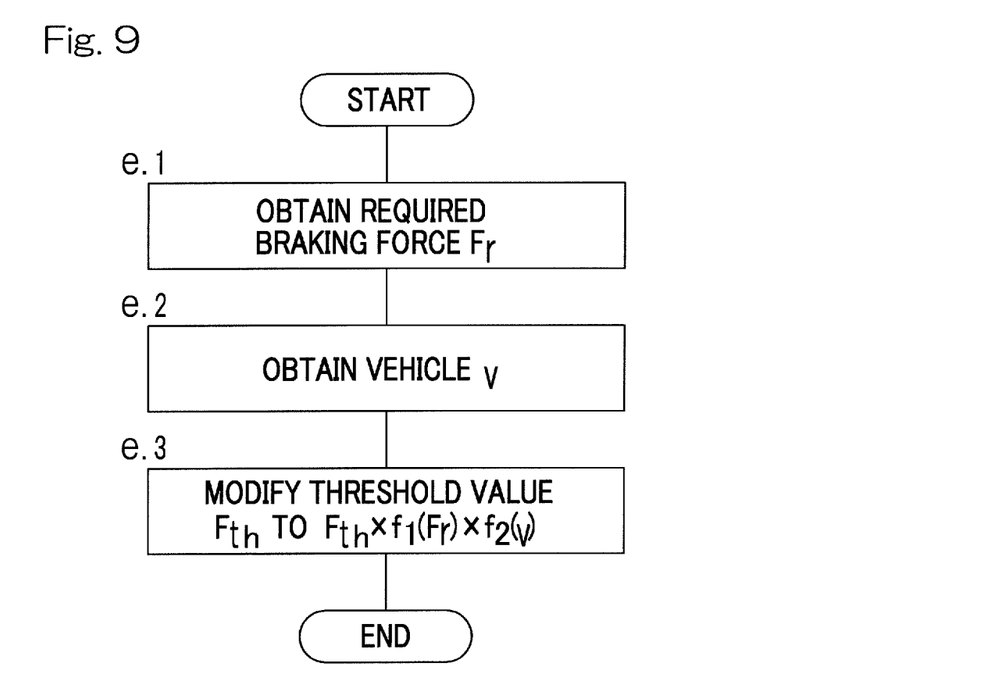
FIG. 9 is a flowchart showing still another example of a process added to the basic control example by the response requirement determination module in the electric brake system.

FIG. 9 shows an example in which the threshold value for response requirement determination is changed in accordance with the target braking force and the vehicle speed. In the process in FIG. 9, a required braking force $F_r$ is obtained (step e.1), a vehicle speed v is obtained (step e.2), and then the threshold value $F_{th}$ is modified by, for example, being multiplied by a weighting function value like $F_{th} \times f_1(F_r) \times f_2(v)$ (step e.3). In FIG. 9, $F_{th}$ represents all the threshold values such as $F_{thxx}$ and $F_{thln}$ shown in FIG. 5 and FIG. 6.

The characteristics of the weighting function and the threshold values described above are determined on the basis of a simulation result, an experiment result, or an actual measurement result. It is noted that, in the example in FIG. 9, the wheel speed may be used instead of the vehicle speed v.

Figure 10:
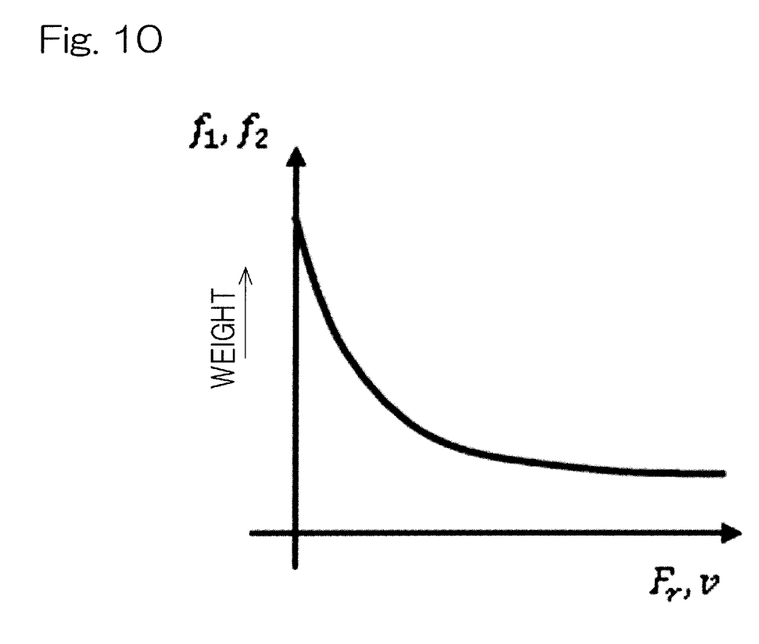
FIG. 10 is a graph showing an example of a weighting function to be multiplied with a threshold value for response requirement determination in the electric brake system.

In general, when the braking force is small, preload to each torque transmission portion is low, and therefore an electric brake operation sound such as tooth hammering noise of gears is likely to occur and a silent response is required. In addition, in general, road noise tends to decrease as the vehicle speed decreases, and therefore a silent response is required. In the control example in FIG. 5 and the other control examples, as each threshold value increases, the response requirement becomes more likely to shift to a slower side. Therefore, if each threshold value is multiplied with the weighting function $f_1$ for the required braking force and the weighting function $f_2$ for the vehicle speed that have characteristics as shown in FIG. 10, a suitable configuration is obtained for the case where silent operation is required as described above. It is noted that there is a possibility that increase in the braking distance due to reduction in responsiveness, but as the vehicle speed is lowered or if the braking force is extremely low, influence of the reduction in responsiveness decreases. Therefore, there is no problem as long as appropriate setting is performed.

Table 1 shows a concept of importance of responsiveness and NVH in each brake condition and each travelling condition.

TABLE 1

| | | Level of Importance | |
|---|---|---|---|
| | Brake input | Responsiveness | NVH |
| Braking requirement | Quick brake operation | High | Low |
| | Mild brake operation | Very Low | High |
| | Antilock control | Very High | Very Low |
| | Spin prevention control | Very High | Low |
| | Skid prevention control | High | Low |
| | Strong braking | High | Low |
| | Weak braking | Low | High |
| Vehicle condition | High-speed travelling | High | Low |
| | Low-speed travelling | Low | High |
| | Stopped | Very Low | Very High |

Figure 11:
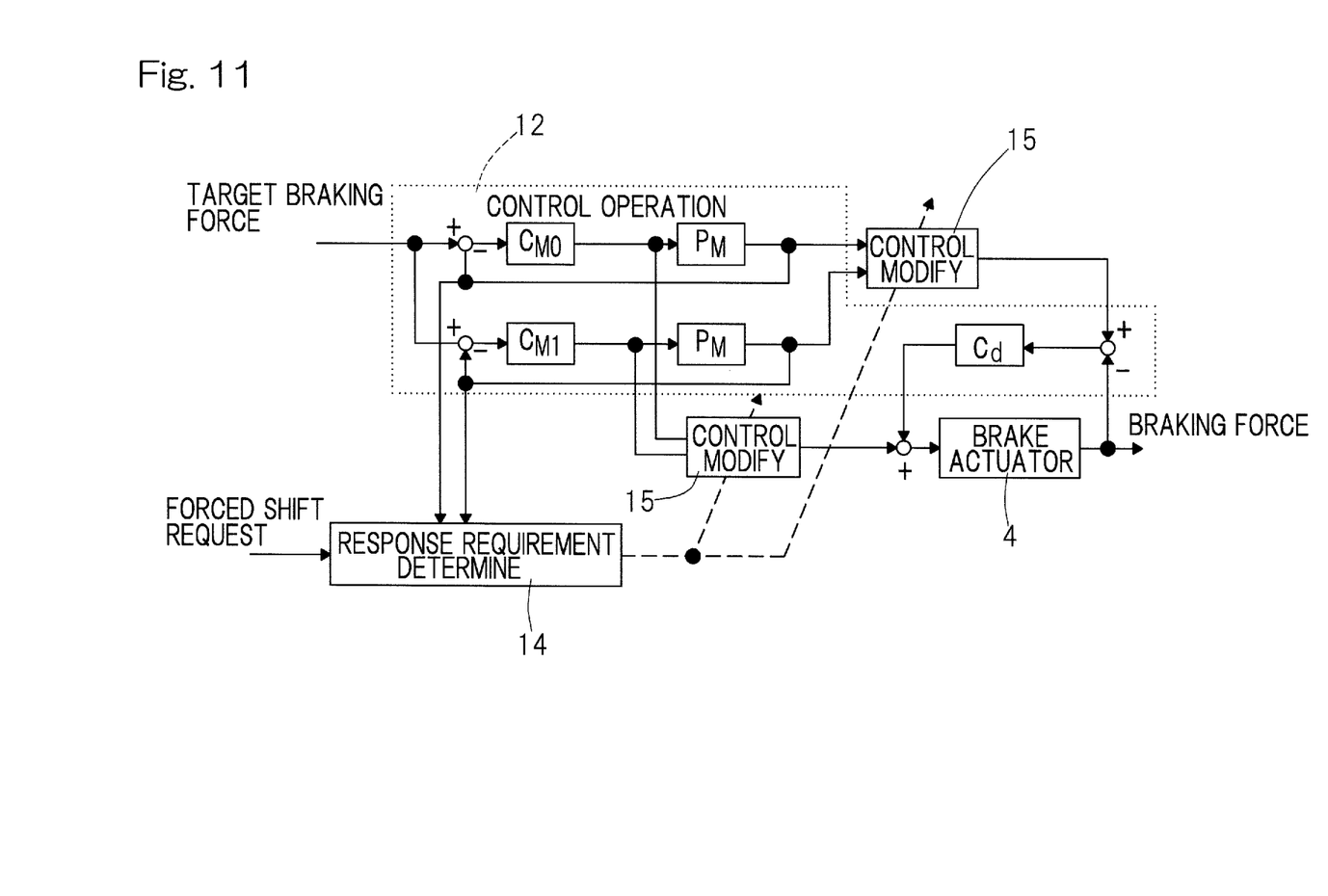
FIG. 11 is a block diagram showing an example of the configuration of the control operation module in the electric brake system.

FIG. 11 shows an example of implementation of controlling parts. The outline will be described before explanation of FIG. 11. The response requirement determination module 14 may estimate responses of the brake actuator 4 each obtained when a corresponding one of the plurality of control operation formulas in the control operation module 12 is used. The control modification module 15 allows switchover among the plurality of control operation formulas. The response requirement determination module 14 may also compare the plurality of estimation results with each other, and then determine responsiveness of the braking force on the basis of the estimation comparison results. FIG. 11 shows a specific example for performing this process. It is noted that the conceptual configuration shown in FIG. 3 and FIG. 4 in which the control modification module 15 outputs a command for switching among the plurality of control operation formulas in the control operation module 12 is realized by a configuration in which the control modification module 15 such as a selector switches among outputs from the control operation formulas in the control operation module 12, in a configuration in FIG. 11.

The control operation module 12 has a control target model $P_M$ representing physical properties of the electric brake actuator 4. The control operation module 12 performs control operation for the control target model $P_M$ by a model controller $C_M$ ($C_{M0}$, $C_{M1}$), to cause the brake actuator 4 to operate so as to perform the same operation as the control target model $P_M$. As for error between the control target model $P_M$ and the actual system, compensation is performed by an error compensation controller Cd so as to eliminate influence of the error. It is noted that, in FIG. 11, the motor driver 13 is not shown.

The response requirement determination module 14 compares responses of the control target models $P_M$, each obtained when corresponding model controller $C_M$ ($C_{M0}$, $C_{M1}$) is used. The model controllers $C_{M0}$, $C_{M1}$ have different response speeds. The response requirement determination module 14 then derives the degree of change in the target braking force in determination of the response requirement. For example, if change in the target braking force increases, difference between responses of the fast response model and the slow response model becomes great, and thus the degree of change in the target braking force can be figured out. It is noted that a "forced shift request" in FIG. 11 indicates shifting of a response requirement based on such a determination as shown in, for example, FIG. 7 and FIG. 8.

The control modification module 15 are represented as a switch function in FIG. 11 by selecting a response of a model to be referred to and by selecting an operation amount of the model controller with respect to the model. If the configuration in FIG. 11 is employed, in determination for performing control switching or changing, a response requirement is determined on the basis of the characteristics of the controller to be actually applied, thereby performing control switching or changing, and thus a suitable configuration is obtained. For example, outputs of brake actuator models controlled by the respective model controller $C_M$ ($C_{M0}$, $C_{M1}$) are compared with each other, and then, if difference between the output according to the fast response model controller and the output according to the slow response model controller becomes great, it is possible to determine that a target value for which sufficient responsiveness will not be obtained with the slow response controller is inputted.

In the example in FIG. 11, switching is performed using two models and two model controllers. However, in a similar configuration, switching may be performed using a larger number of, i.e., three or more controllers and/or models.

It is noted that the target braking force determination module 7, the response requirement determination module 14, and/or the control operation module 12 may be, specifically, configured from a hardware circuit or a software function on a processor (not shown), that is capable of performing calculation and outputting a result thereof, by using a look up table (LUT) realized by software or hardware, a predetermined conversion function stored in a library of software, hardware equivalent thereto, or the like, and as necessary, a comparison function, hardware equivalent thereto, or the like (hereinafter, such a configuration is referred to as an "embodied model"). In the case where the control modification module 15 is configured to adjust the function of the control operation module 12 as shown in FIG. 3 and FIG. 4 and is not configured from hardware such as a selector as described above, the control modification module 15 may be configured using the embodied model.

The electric brake system of the present embodiment will be summarized below. As described above, the response requirement determination module 14 determines responsiveness that can be required for the electric brake device 3, and the control modification module 15 changes the response speed of the braking force with respect to the target braking force in line with a result of the determination. The responsiveness that can be required for the electric brake device 3 is determined from the absolute value, the change rate, and the frequency of the target braking force, the vehicle speed of the vehicle to which the electric brake device is provided, and/or the wheel speed thereof, etc. The response speed of the braking force is changed through changing of a control parameter in control operation for performing follow-up control to the target braking force in the electric brake device 3. Therefore, operation sound and power consumption are reduced without influencing movement of the vehicle, by switching or changing the model controller depending on responsiveness required for the electric brake device 3, and the like.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention defined by claims or in a scope equivalent thereto.

REFERENCE NUMERALS

1 . . . vehicle
2 . . . wheel
3 . . . electric brake device
4 . . . brake actuator
5 . . . electric brake control device
6 . . . high-level ECU
7 . . . target braking force determination module
8 . . . brake operation member
12 . . . control operation module
14 . . . response requirement determination module
15 . . . control modification module
17 . . . wheel speed control device
31 . . . brake rotor
32 . . . friction member
33 . . . friction member actuator
34 . . . electric motor

What is claimed is:

1. An electric brake system including one or more electric brake device, each electric brake device includes:
    a brake actuator mounted on a vehicle, the brake actuator having a brake rotor, a friction member, a friction member actuator configured to press the friction member to the brake rotor, and an electric motor configured to drive the friction member actuator; and
    a control operation module configured to perform follow-up control so that a braking force generated by the brake actuator follows a target braking force by controlling the electric motor, the electric brake system comprising:
    a response requirement determination module configured to determine responsiveness required for the brake actuator, by applying a predetermined rule, from one or both of a braking requirement and information about a travelling condition of the vehicle, the braking requirement being outputted from a brake operation member which is manipulated by a vehicle operator or from a vehicle-stable-travelling control system for generating the braking force to cause the vehicle to travel stably; and
    a control modification module configured to change a control operation formula to be used for the follow-up control by the control operation module, depending on the responsiveness determined by the response requirement determination module.

2. The electric brake system as claimed in claim 1, wherein
    the response requirement determination module determines the responsiveness from the target braking force or a control target value obtained from the target braking force.

3. The electric brake system as claimed in claim 1, wherein
    the response requirement determination module estimates responses of the brake actuator, each response being obtained when a corresponding one of a plurality of control operation formulas is applied, the control modification module allowing switchover among the plurality of control operation formulas, compares the plurality of estimation results with each other, and determines the responsiveness on the basis of the estimation comparison results.

4. The electric brake system as claimed in claim 1, wherein
    the response requirement determination module determines the responsiveness from at least one of a speed of the vehicle on which the electric brake device is mounted, and a wheel speed thereof.

5. The electric brake system as claimed in claim 1, further comprising a wheel speed control device configured to control a wheel speed with use of a braking force without depending on the vehicle operator's manipulation to the brake operation member of the vehicle to which the electric brake system is provided, wherein
    in a state in which the control by the wheel speed control device is being executed, the response requirement determination module selects a predetermined control operation formula that achieves fast responsiveness as the control operation formula.

6. The electric brake system as claimed in claim 4, wherein
    when the speed of the vehicle to which the electric brake system is provided is equal to or smaller than a predetermined value, the response requirement determination module selects a predetermined control operation formula that achieves slow responsiveness as the control operation formula.

\* \* \* \* \*